United States Patent
Tsirkin et al.

(10) Patent No.: US 8,665,893 B2
(45) Date of Patent: Mar. 4, 2014

(54) SWITCHING OF A RECEIVE QUEUE ASSOCIATED WITH A VIRTUAL MACHINE

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 239 days.

(21) Appl. No.: 13/278,534

(22) Filed: Oct. 21, 2011

(65) Prior Publication Data
US 2013/0100960 A1  Apr. 25, 2013

(51) Int. Cl.
*H04L 12/28* (2006.01)

(52) U.S. Cl.
USPC .......................................... 370/412

(58) Field of Classification Search
USPC .......................................... 370/412
See application file for complete search history.

(56) References Cited

U.S. PATENT DOCUMENTS

| | | | | |
|---|---|---|---|---|
| 8,539,010 B2* | 9/2013 | Inakoshi | ............................ | 708/1 |
| 2008/0148008 A1* | 6/2008 | Arndt et al. | .................. | 711/209 |
| 2013/0024722 A1* | 1/2013 | Kotagiri et al. | ................ | 714/6.1 |

* cited by examiner

*Primary Examiner* — Dang Ton
*Assistant Examiner* — Nourali Mansoury
(74) *Attorney, Agent, or Firm* — Lowenstein Sandler LLP

(57) ABSTRACT

Methods and systems for managing multiple receive queues of a networking device of a host machine in a virtual machine system. The networking device includes multiple receive queues that are used to receive packets intended for a guest of the virtual machine system and pass the packets to the intended virtual machine. A hypervisor of the virtual machine system manages the switching from one or more receive queues (i.e., old receive queues) to one or more other receive queues (i.e., new receive queues) by managing the provisioning of packets from the receive queues to one or more virtual machines in the virtual machine system.

18 Claims, 6 Drawing Sheets

SWITCHING OF A RECEIVE QUEUE ASSOCIATED WITH A VIRTUAL MACHINE

TECHNICAL FIELD

Embodiments of the present invention relate to a computer system, and more specifically, to network device management in a virtual machine system.

BACKGROUND

Virtualization allows multiplexing of an underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor, or a host operating system. The hypervisor emulates the underlying hardware of the host computer, making the use of the virtual machine transparent to the guest operating system and the user of the computer.

One such resource managed by the host computer is a networking device that may be used by multiple guests (i.e., virtual machines) operating at the same time. Each guest or virtual machine is assigned a different and unique network address, such as a virtual LAN (VLAN) tag and/or a media access control (MAC) address, or some other combination of data in a packet header. The networking device has multiple queues for managing incoming packets to be received by a virtual machine and outgoing packets transmitted by a virtual machine. Dedicated queues may be used which are mapped to a specific hardware address and dedicated to a specific virtual machine. In addition, shared queues may be employed which are shared by multiple virtual machines. However, the management of the multiple dedicated and shared queues of the virtual machine system creates a significant administrative burden for the host computer administrator including the continual monitoring, evaluating and re-allocating of the queues based on the frequently changing queue activity.

When a packet is received in a shared queue, the host computer needs to look at the received packet in order to determine which guest (virtual machine) should receive the packet. As such, the packet can not be placed directly into a memory of the guest virtual machine for which it is intended. Instead of maintaining a desirable zero copy environment, the host computer must make a copy of the packet, thereby expending additional computational and storage resources.

In addition, there may be a need to switch a virtual machine and its one or more associated receive paths from one receive queue (i.e., an old queue) to another receive queue (i.e., a new queue). However, if the virtual machine system immediately executes the switch there may be packets intended for the virtual machine that are outstanding on the old queue (i.e., one or more packets provided to a network device for delivery to the virtual machine, but not yet delivered to the intended virtual machine). Accordingly, if the switch occurs automatically without regard to the outstanding packets on the old queue, then the outstanding packets may be passed or delivered to an unintended virtual machine (i.e. a virtual machine that is newly assigned to the old queue). In such cases, the unintended virtual machine receives packets intended for a different virtual machine, resulting in a loss of privacy.

DETAILED DESCRIPTION

Figure 1:
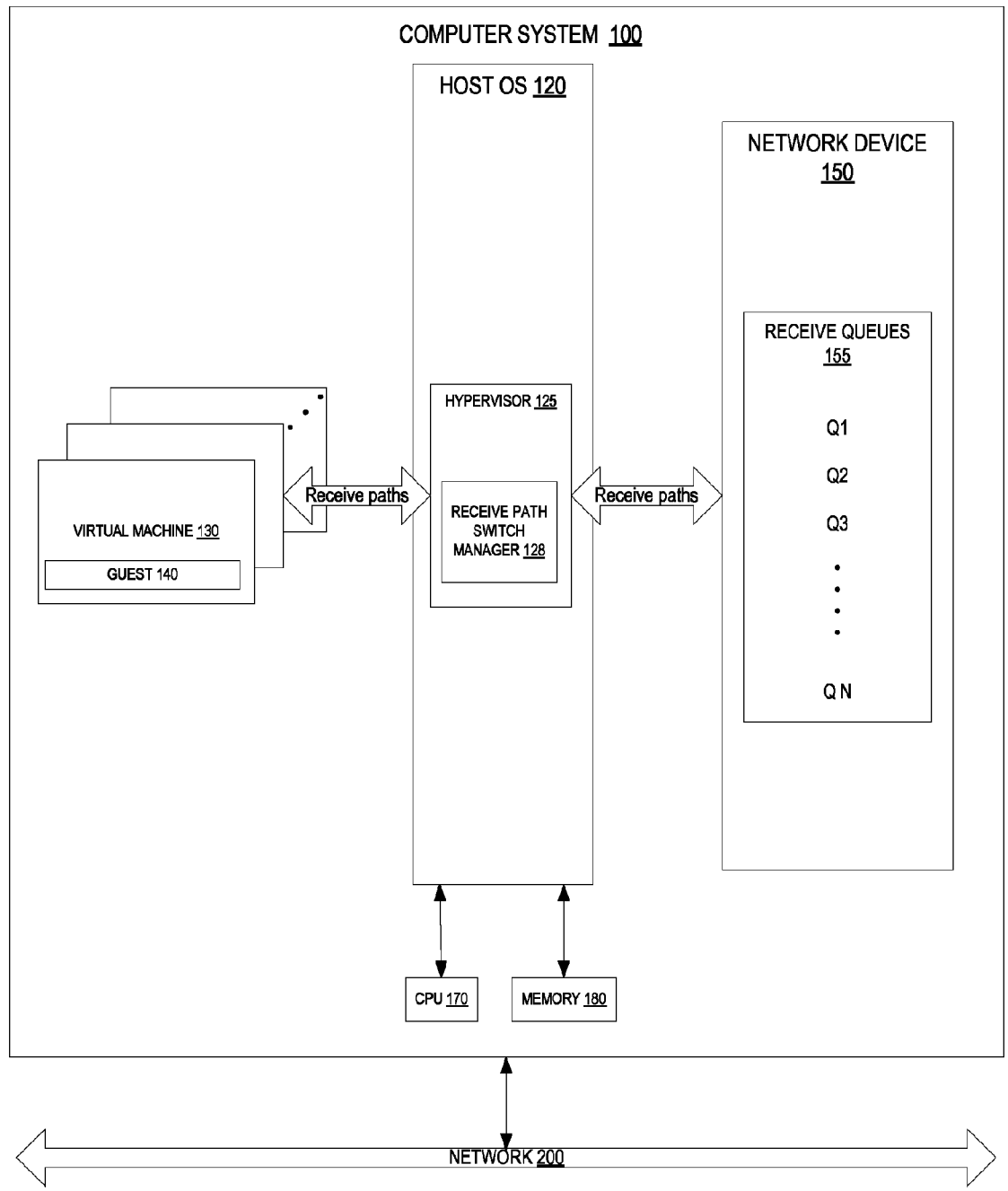
FIG. 1 is a block diagram of a virtual machine system that hosts multiple guests, according to an embodiment of the invention.

Methods and systems for managing multiple receive queues of a networking device of a host machine in a virtual machine system. The methods and systems of the present invention provide for the dynamic management of the multiple receive queues, wherein the receive queue switching is performed without interrupting or stopping the normal packet receipt processing. The networking device includes receive queues that are used by multiple virtual machines (VMs) and associated guests of the virtual machine system for the delivery of packets to a virtual machine in a data communication. A hypervisor of the virtual machine system manages the switching from one or more receive queues (i.e., the "old queue(s)" or "old receive queue(s)" or "Q1, Q2, etc.") to one or more other receive queues (i.e., the "new queue" or "new receive queue" or "QN1, QN2, etc.") by managing a flow of packets in the virtual machine system to identify an appropriate time to pass or deliver packets on a new receive queue to one or more virtual machines following execution of a switch instruction while preserving the privacy of the virtual machines and maintaining a zero-copy environment (i.e., wherein a separate copy of the packets are not stored directly in a memory of the intended virtual machine).

In an embodiment, the hypervisor monitors the receive paths of the virtual machine system. A receive path may be specified by a receive queue and an intended recipient virtual machine address (e.g., Q1-VM1). One having ordinary skill in the art will appreciate that a receive path may also be defined using any suitable path identifying information, including, but not limited to, an IP address and/or a port address.

In an embodiment, the hypervisor instructs a network device managing the multiple receive queues to switch one or more receive paths associated with a virtual machine (VM) from an old receive queue (Q1) to a new receive queue (QN). The hypervisor provides an instruction to the network device to set the new receive queue (QN) to a list queuing mode (i.e., a state or setting of the receive queue wherein received packets are placed on a list in the receive queue, but not passed to the intended virtual machine). The hypervisor records a time when the instruction to switch was executed (herein referred to as the "switch instruction time" or "Ts").

The hypervisor receives a notification from the network device indicating that a new packet was received on the old receive queue (Q1), at a packet receipt time or "Tr". If the hypervisor determines that the packet receipt time is after the switch instruction time, the hypervisor instructs the network device to provide all packets on the new receive queue to the intended virtual machine. If the packet receipt time is before the switch instruction time, regular delivery of the packet occurs using the old receive queue. Following delivery of the one or more packets on the old receive queue to the intended virtual machine, the hypervisor instructs the network device to remove the new receive queue from list queuing mode by disabling the mode and returning the new receive queue to its normal operating state.

In an example described herein, an intended recipient virtual machine ("VM1") having an associated receive path (Q1-VM1) is being switched from an old receive queue (Q1) to a new receive queue (QN). This example illustrates an embodiment for switching a dedicated receive queue (Q1) to a shared receive queue (QN). One having ordinary skill in the art will appreciate that the example is presented for illustration purposes, and is not intended to limit the scope of the embodiments described herein. For example, one having ordinary skill in the art will appreciate that the virtual machine (VM1) may have any number of old receive queues and receive paths that are being switched to any number of new receive queues and new receive paths. In addition, one having ordinary skill in the art will appreciate that the system and method described herein may be used for the switching of a dedicated receive queue to a shared receive queue (as in the example) and the switching of a shared receive queue to a dedicated receive queue. Furthermore, one having ordinary skill in the art will appreciate that the system and method described herein may be used for switching one or more shared receive queues to one or more other shared receive queues, or for switching a dedicated receive queue to another dedicated receive queue.

Throughout the following description, the term "guest" refers to the software that runs or can run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a hypervisor that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

Accordingly, an efficient method and system is provided that optimizes the switching from an old receive queue to a new receive queue in a virtual machine system. The described switching management provides for a virtual machine system wherein all packets from the receive queues are delivered to the intended virtual machine in a manner that preserves the privacy of the multiple virtual machines, without the need to store a copy of the packets directly into a memory associated with the virtual machine.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an embodiment of a computer system 100 in which embodiments of the present invention may operate. The computer system 100 hosts multiple virtual machines (VM) 130. Each virtual machine 130 runs a guest (e.g., guest 140) that uses a guest operating system to manage its resources. The virtual machines 130 may run the same or different guest operating systems, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

In one embodiment, the computer system 100 runs a hypervisor 125 to virtualize access to the underlying host hardware, making the use of the virtual machine 130 transparent to the guest 140 and the users of the computer system 100. In one embodiment, the hypervisor 125 may support multiple virtual machines 130. In one embodiment, the hypervisor 125 is part of a host operating system (OS) 120.

In one embodiment, the computer system 100 is accessible by remote systems via a network 200. The network 200 may be a private network (e.g., a local area network (LAN), a wide area network (WAN), intranet, etc.) or a public network (e.g., the Internet).

The computer system 100 also includes hardware components such as one or more physical central processing units (CPUs) 170, host memory 180, and other hardware components. In one embodiment, the computer system 100 also includes a network device 150 communicatively coupled to the guest 140 via receive paths managed by the hypervisor 125. During operation, each guest 140 interacts with the host OS 120 via a virtual machine 130 having a specific network address (herein the "virtual machine address"). The virtual machine address may be any suitable protocol or format, including a virtual LAN (VLAN) tag and/or a media access control (MAC) address. Each virtual machine address is assigned to one or more of the receive queues 155 (i.e., Q1, Q2, Q3, . . . QN) maintained by the network device 150. One having ordinary skill in the art will appreciate that the receive queues 155 may be a collection of dedicated queues and shared queues.

According to one embodiment of the present invention, the hypervisor 125 includes a receive path switch manager 128 configured to manage the switching of one or more receive queues 155 assigned to the one or more virtual machines 130 and associated guests 140 from an old receive queue to a new receive queue according to the methodology described in detail below in connection with FIG. 3.

Figure 2:
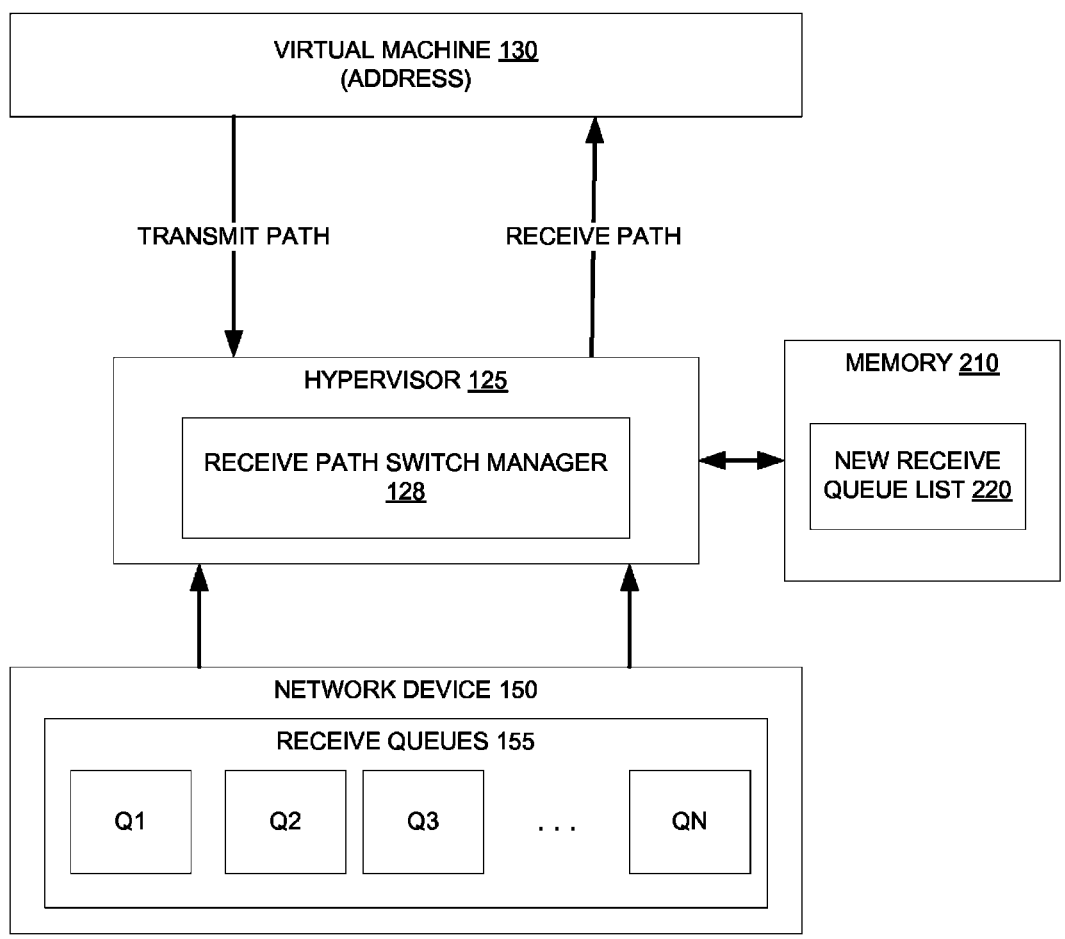
FIG. 2 is a block diagram of a hypervisor, a network device, and a virtual machine in a virtual machine system, according to an embodiment of the invention.

FIG. 2 is a block diagram of an exemplary hypervisor 125, a network device 150, and a virtual machine 130 in a virtual machine system, according to one embodiment of the invention. As shown in FIG. 2, the hypervisor 125 includes a receive path switch manager 128 configured to manage the switching of one or more receive paths associated with a virtual machine to one or more selected receive queues, according to the exemplary process flow described below in connection with FIG. 3. The receive path switch manager 128 is connected to a memory 210 associated with the hypervisor 125. The memory 210 is configured to store the received packets including packet information. As used herein, the term "packet information" includes any information identifying the packet, including but not limited to, associated pointer information, a timestamp identifying the time the packet was received (i.e., the packet receipt time), an IP address, a MAC address, a VLAN tag, etc.

Figure 3:
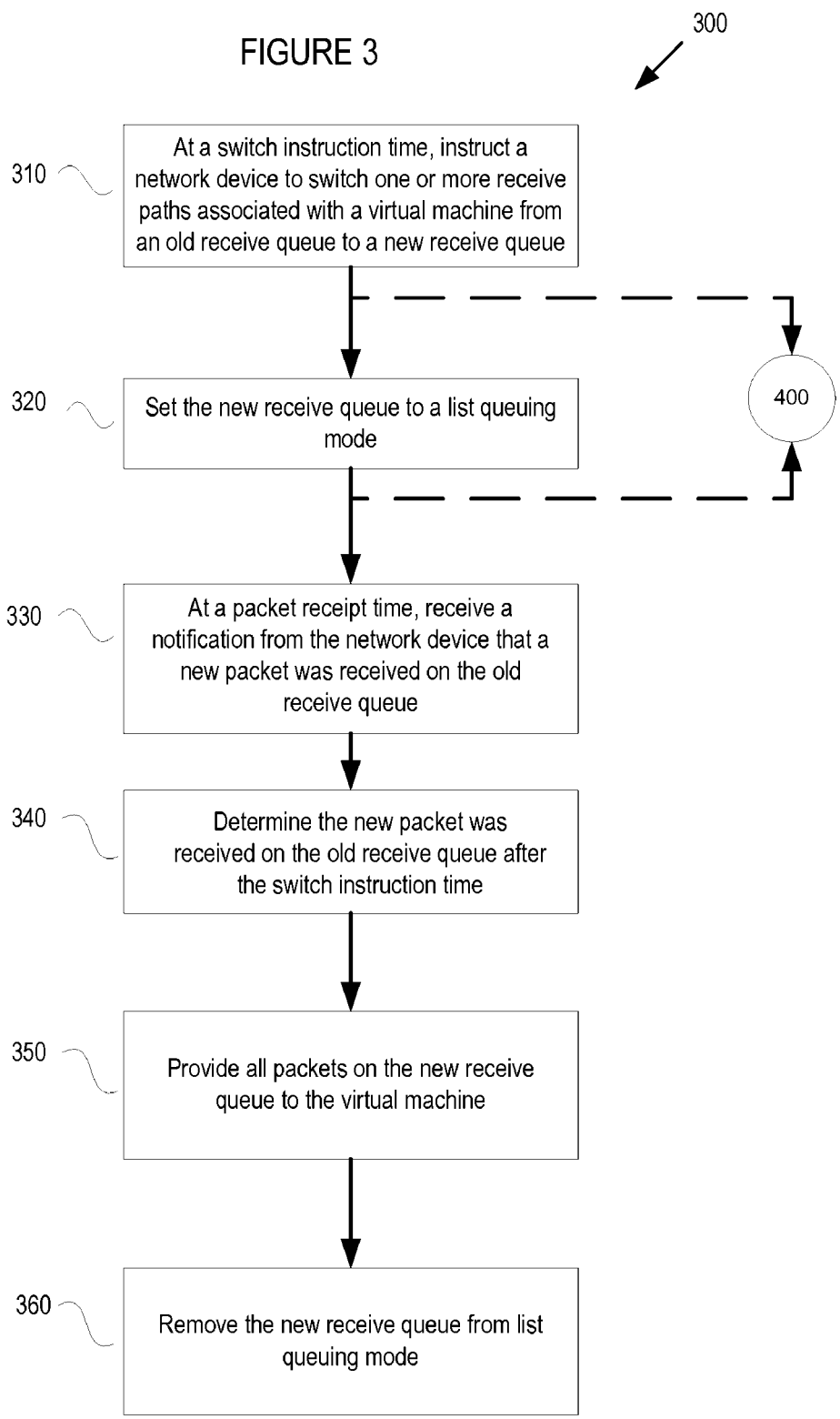
FIG. 3 is a flow diagram of one embodiment of a method for switching receive queues in a virtual machine system.

FIG. 3 is a flow diagram illustrating one embodiment of a method 300 for dynamically managing multiple receive queues of a virtual machine system, without interrupting or stopping the normal packet receipt processing. The method 300 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 300 is performed by the receive path switch manager 128 of the hypervisor 125 of FIG. 1 and FIG. 2.

Referring to FIG. 3, in one embodiment, the method 300 begins when the receive path switch manager 128 of the hypervisor 125 provides an instruction to a network device 150 to switch one or more receive paths associated with a virtual machine from one or more old receive queues to one or more new receive queues, at a switch instruction time (Ts), in block 310. In an embodiment, the switch instruction may be triggered as part of the management of the receive queues and the current network conditions in an effort to optimize the balancing of the loads placed on the respective receive queues. In the described example, the receive path switch manager 128 provides the switch instruction to the network device at a switch instruction time (Ts) to switch virtual machine (VM1) from an old receive queue (Q1) to a new receive queue (QN). For example, the receive path switch manager 128 may provide a simple command to the network device through a NIC driver, such as a command having the following format: switch VM identifier from receive path X to receive path Y. In the example, the pre-switch receive path associated with VM1 is referred to as Q1-VM1 and the post-switch receive path associated with VM1 is referred to as QN-VM1.

In block 320, the receive path switch manager 128 provides an instruction to the network device to set the new receive queue (QN) to a list queuing mode. The list queuing mode is a state or setting of the receive queue wherein received packets are placed on a list in the receive queue, but not passed to the intended virtual machine. In block 330, the receive path switch manager 128 receives a notification from the network device that a new packet was received on the old receive queue, at a packet receipt time.

The receive path switch manager 128 compares the switch instruction time and the packet receipt time to determine whether the new packet was received on the old receive queue after the switch instruction time, in block 340. If so, the receive path switch manager 128 instructs the network device to provide all packets on the new receive queue to the intended virtual machine, in block 350. If the new packet was received on the old queue before the switch instruction time, regular delivery occurs using the old receive queue. Following delivery of the packets from the new receive queue to the intended virtual machine, the receive path switch manager 128 instructs the network device 150 to remove the new receive queue from the list queuing mode.

Figure 4:
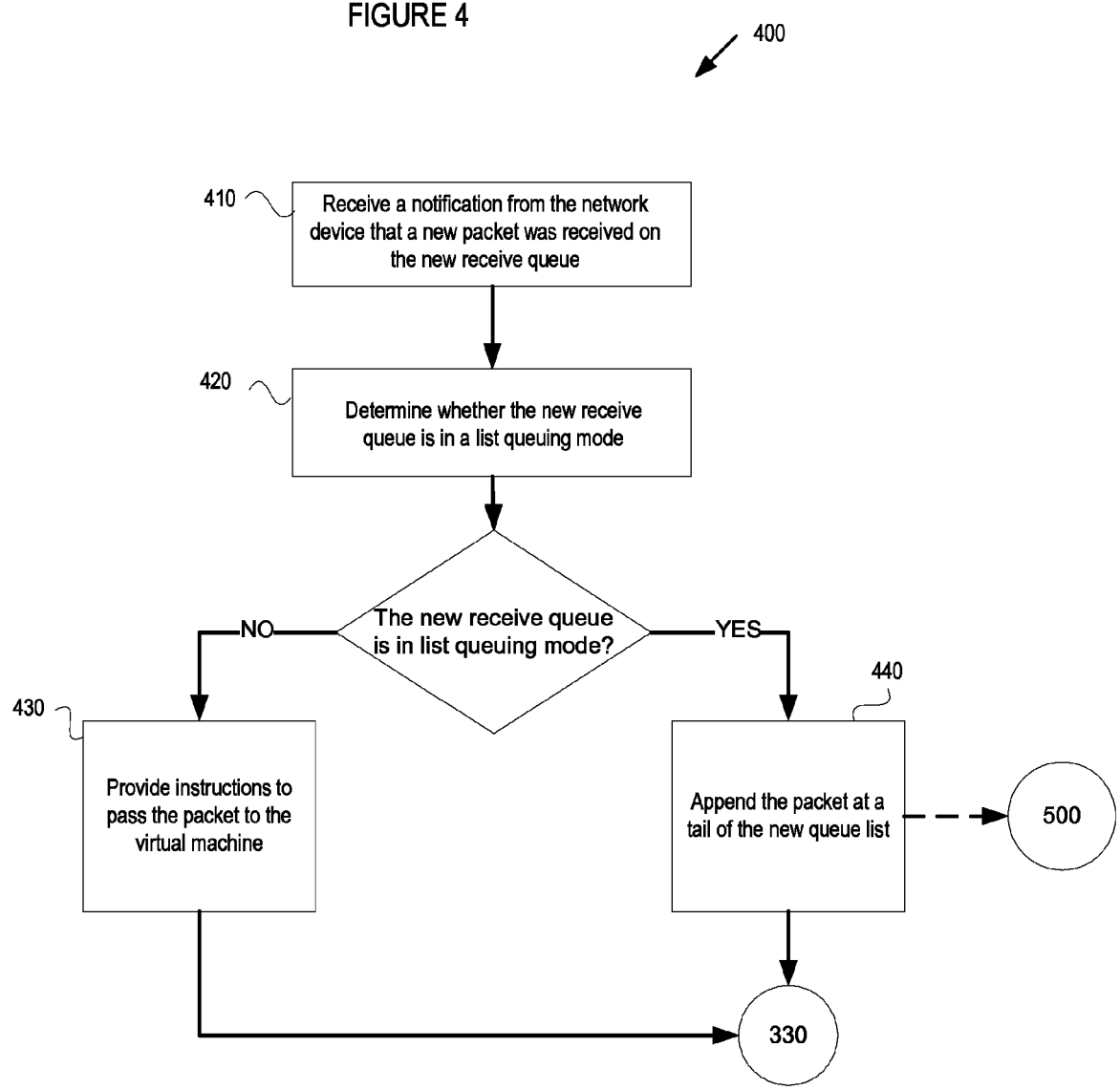
FIG. 4 is a flow diagram of another embodiment of a method for switching receive queues in a virtual machine system.

As shown in FIG. 3, following block 310, method 300 may continue to method 400 shown in FIG. 4, according to an embodiment of the present invention. It is to be appreciated that method 400 may be performed either prior to or after the execution of block 320 in FIG. 3. Furthermore, it is noted that method 400 is optional, as denoted by the dashed lines shown in FIG. 3.

FIG. 4 is a flow diagram of an embodiment of a method for switching receive queues in a virtual machine system. In block 410, following the switch instruction in block 310 shown in FIG. 3, the receive path manager 128 receives a notification from the network device 150 that a new packet was received on the new receive queue.

The receive path switch manager 128 determines whether the new receive queue is in the list queuing mode, in block 420. If the new receive queue is not in the list queuing mode, the receive path switch manager 128 provides instructions to the network device 150 to pass the packet to the intended virtual machine, at block 430. If the new receive queue is in the list queuing mode, the packet is appended at a tail of a list queued on the new receive queue, at block 440. Following blocks 430 and/or 440, method 400 continues to block 330 of method 300 shown in FIG. 3. Optionally, following block 440, method 400 continues to method 500 shown in FIG. 5.

Figure 5:
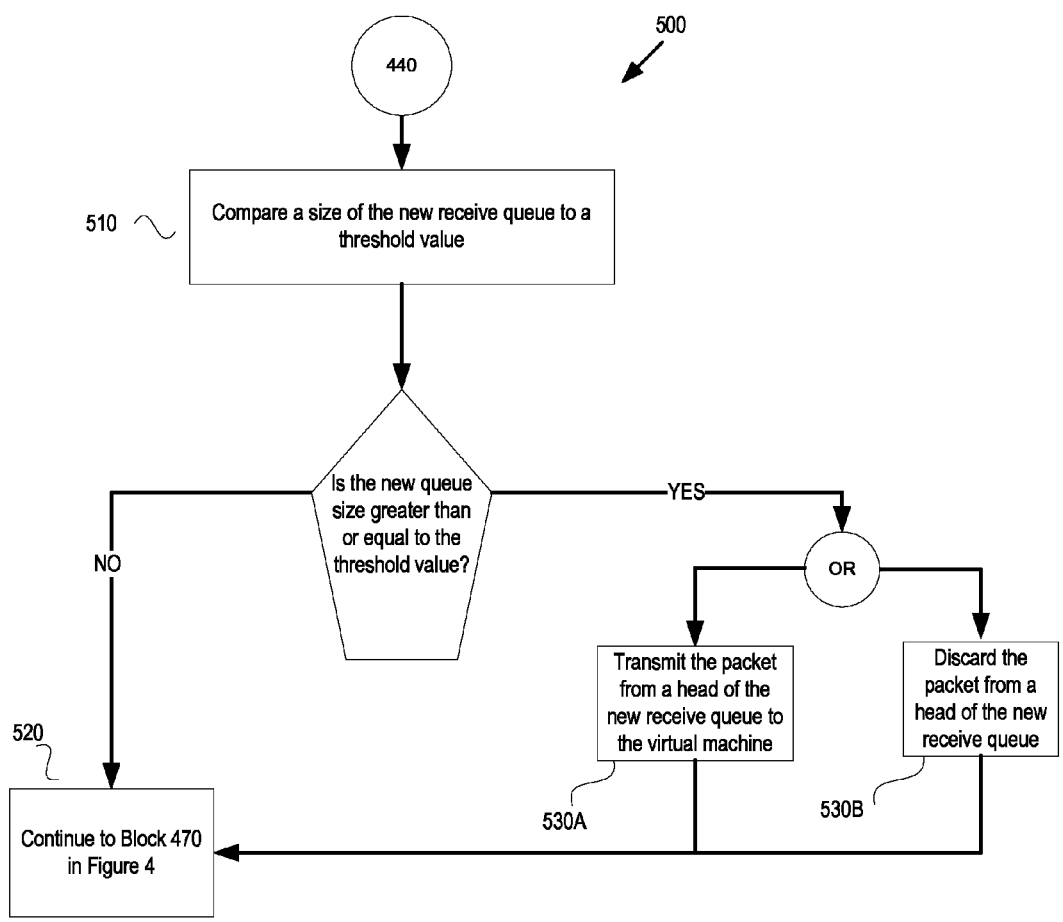
FIG. 5 is a flow diagram of yet another embodiment of a method for switching receive queues in a virtual machine system.

FIG. 5 illustrates an optional embodiment of a method for switching receive queues in a virtual machine system including a check of the size of a new receive queue to determine whether a capacity of the new receive queue exceeds a predetermined threshold. In method 500, following appending the new packet for receipt to a tail of the list of packets on the new receive queue in block 440 of FIG. 4, the receive path switch manager 128 compares a size of the new receive queue to a threshold value. The size of the new receive queue may be measured in any suitable manner, including, for example, a sum of packet lengths, a number of packets, or a total number of scatter/gather entries. The threshold value could be any metric used by the receive path switch manager 128 in the comparison with the new receive queue size, including, but not limited to, a capacity of the new receive queue.

If the new receive queue size is less than the threshold value, then in block 520, method 500 returns to block 470 of method 400, illustrated in FIG. 4. If the new receive queue size is greater than or equal to the threshold value, the receive path switch manager 128 may either instruct the network device 150 to pass or deliver a packet from the head of the new receive queue (in block 530A) or discard a packet from the head of the new receive queue (in block 530B), prior to returning to block 470 in FIG. 4.

Figure 6:
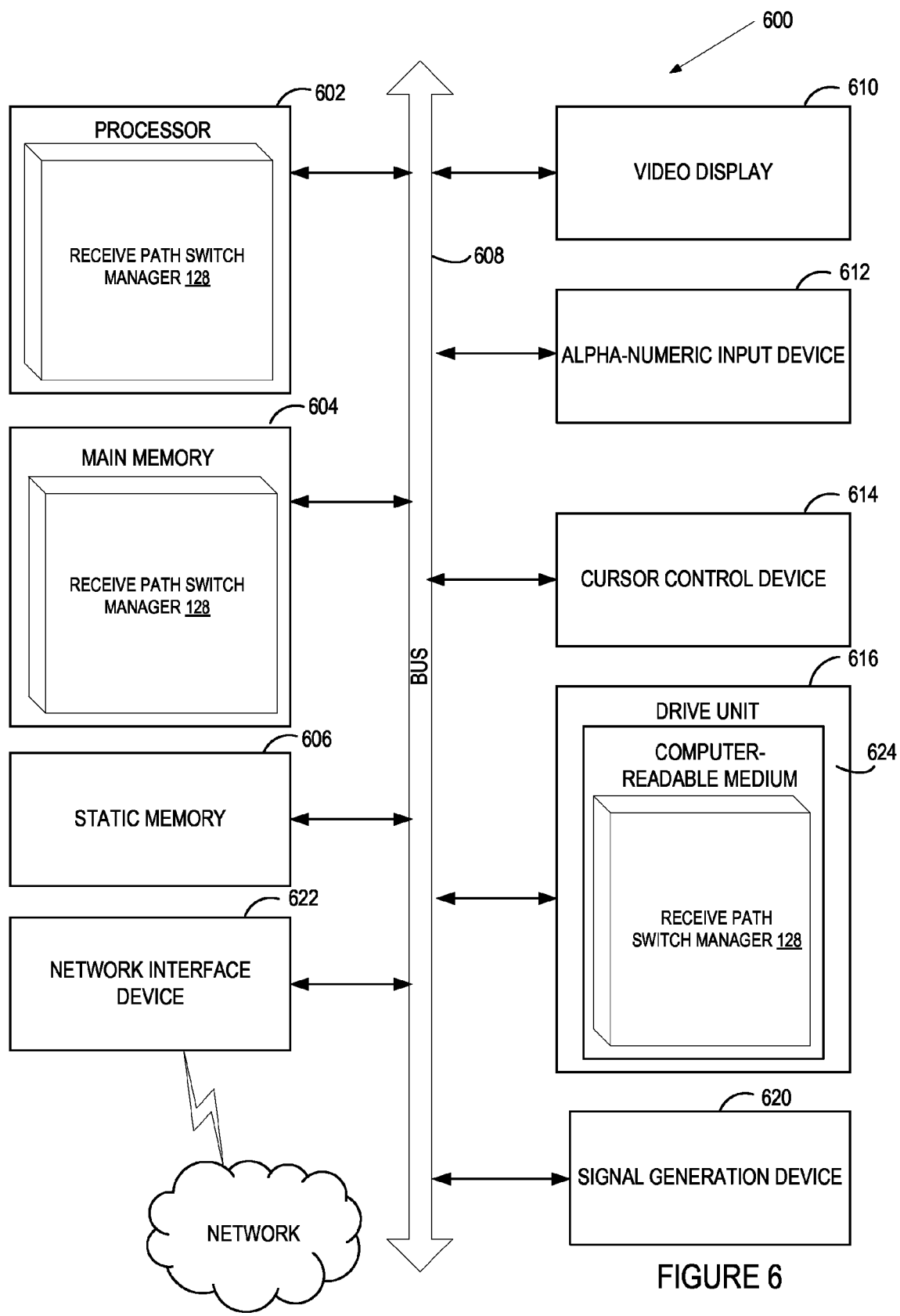
FIG. 6 illustrates a diagrammatic representation of a machine an exemplary receive queue management system.

FIG. 6 illustrates a diagrammatic representation of a machine in the exemplary form of a computer system 600 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The receive path switch manager 128 in FIG. 1 may comprise processor 602 configured to perform the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

A drive unit 616 may include a computer-readable medium 624 on which is stored one or more sets of instructions (e.g., instructions of the receive path switch manager 128) embodying any one or more of the methodologies or functions described herein. The instructions of the receive path switch manager 128 may also reside, completely or at least partially, within the main memory 604 and/or within the processor 602 during execution thereof by the computer system 600, the main memory 604 and the processor 602 also constituting computer-readable media. The instructions of the receive path switch manager 128 may further be transmitted or received over a network via the network interface device 622.

While the computer-readable storage medium 624 is shown in an exemplary embodiment to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "instructing", "setting", "receiving", "determining", "providing", "disabling", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for managing a virtual machine system, comprising:
   instructing a network device to switch a receive path associated with a virtual machine from an old receive queue to a new receive queue, at a switch instruction time;
   setting, by the network device, the new receive queue to a list queuing mode;
   receiving a notification of receipt of a packet on the old receive queue, at a packet receipt time;
   determining the packet receipt time is after the switch instruction time;
   providing one or more packets on the new receive queue to the virtual machine; and
   disabling, by the network device, the list queuing mode of the new receive queue.

2. The computer-implemented method of claim 1 further comprising:
   receiving a notification of receipt of a new packet on the new receive queue;
   determining the new receive queue is in the list queuing mode; and
   appending the new packet to a list on the new receive queue.

3. The computer-implemented method of claim 2, wherein appending the new packet to the list on the new receive queue further comprises:

comparing a size of the new receive queue to a threshold value, and instructing the network device to pass a packet from a head of the new receive queue to the virtual machine when the size of the new receive queue is greater than or equal to the threshold value.

4. The computer-implemented method of claim 1, wherein the packet comprises packet information indicating the packet receipt time.

5. The computer-implemented method of claim 1 further comprising storing the packet in a host memory.

6. The computer-implemented method of claim 1, wherein the old receive queue is a dedicated queue and the new receive queue is a shared queue.

7. A non-transitory computer readable storage medium programmed to cause a processing system to perform operations comprising:

instructing a network device to switch a receive path associated with a virtual machine from an old receive queue to a new receive queue, at a switch instruction time;

setting the new receive queue to a list queuing mode;

receiving a notification of receipt of a packet on the old receive queue, at a packet receipt time;

determining the packet receipt time is after the switch instruction time;

providing one or more packets on the new receive queue to the virtual machine; and disabling the list queuing mode of the new receive queue.

8. The non-transitory computer readable storage medium of claim 7, further comprising:

receiving a notification of receipt of a new packet on the new receive queue;

determining the new receive queue is in the list queuing mode; and appending the new packet to a list on the new receive queue.

9. The non-transitory computer readable storage medium of claim 8, wherein appending the new packet to the list on the new receive queue further comprises:

comparing a size of the new receive queue to a threshold value, and instructing the network device to pass a packet from a head of the new receive queue to the virtual machine when the size of the new receive queue is greater than or equal to the threshold value.

10. The non-transitory computer readable storage medium of claim 7, wherein the packet comprises packet information indicating the packet receipt time.

11. The non-transitory computer readable storage medium of claim 7 further comprising storing the packet in a host memory.

12. The non-transitory computer readable storage medium of claim 7, wherein the old receive queue is a dedicated queue and the new receive queue is a shared queue.

13. A computer system comprising:

a memory, a processing device, coupled to the memory; and a hypervisor hosted by the computer system, having access to the memory and use of the processor, the hypervisor configured to:

instruct a network device to switch a receive path associated with a virtual machine from an old receive queue to a new receive queue, at a switch instruction time;

instruct the network device to set the new receive queue to a list queuing mode;

receive a notification of receipt of a packet on the old receive queue, at a packet receipt time;

determine the packet receipt time is after the switch instruction time;

provide one or more packets on the new receive queue to the virtual machine; and instruct the network device to disable the list queuing mode of the new receive queue.

14. The computer system of claim 13, wherein the hypervisor is further configured to:

receive a notification of receipt of a new packet on the new receive queue;

determine the new receive queue is in the list queuing mode; and append the new packet to a list on the new receive queue.

15. The computer system of claim 14, wherein the hypervisor is further configured to:

compare a size of the new receive queue to a threshold value, and instruct the network device to pass a packet from a head of the new receive queue to the virtual machine when the size of the new receive queue is greater than or equal to the threshold value.

16. The computer system of claim 13, wherein the packet comprises packet information indicating the packet receipt time.

17. The computer system of claim 13, wherein the packet is stored in the memory.

18. The computer system of claim 13, wherein the old receive queue is a dedicated queue and the new receive queue is a shared queue.

* * * * *